United States Patent [19]

Montieth et al.

[11] Patent Number: 5,205,847
[45] Date of Patent: Apr. 27, 1993

[54] AIR CLEANING APPARATUS

[75] Inventors: Grover F. Montieth, Centerville; Tony R. Montieth, Dayton, both of Ohio

[73] Assignee: Roxie's Inc., West Carrollton, Ohio

[21] Appl. No.: 759,493

[22] Filed: Sep. 13, 1991

[51] Int. Cl.$^5$ ............................................. B01D 46/04
[52] U.S. Cl. .......................................... 55/294; 55/302
[58] Field of Search .................. 55/294, 302, 303, 502

[56] References Cited

U.S. PATENT DOCUMENTS

| | | | |
|---|---|---|---|
| 3,000,507 | 9/1961 | Young | 55/302 X |
| 4,253,855 | 3/1981 | Jackson et al. | 55/302 X |
| 4,654,059 | 3/1987 | Matyas | 55/302 X |
| 4,802,983 | 2/1989 | Howeth | 55/302 |
| 4,810,270 | 3/1989 | Terry et al. | 55/302 X |
| 4,826,512 | 5/1989 | Fuller | 55/302 |

Primary Examiner—Charles Hart
Attorney, Agent, or Firm—Jacox & Meckstroth

[57] ABSTRACT

A fabricated sheet metal housing is positioned above a hopper and has inlets for receiving conduits which conduct air carrying small scrap pieces of paper or other material. The housing encloses a perforated cylindrical drum supported for rotation on a horizontal axis, and rotary seals extend between the housing and opposite end portions of the drum and between the drum and a stationary air outlet manifold at one end of the drum. Air flows inwardly through the rotating drum and deposits the pieces on the outer surface of the drum, and a stationary air jet tube within the drum directs a high velocity air stream outwardly and downwardly through the perforated drum for transferring the particles from the drum downwardly into the hopper. A set of motor driven blowers supply the air and pieces of material to the housing and also suck the clean air from the outlet and blow the air through filter bags. Another blower supplies air to the stationary jet tube within the drum.

3 Claims, 3 Drawing Sheets

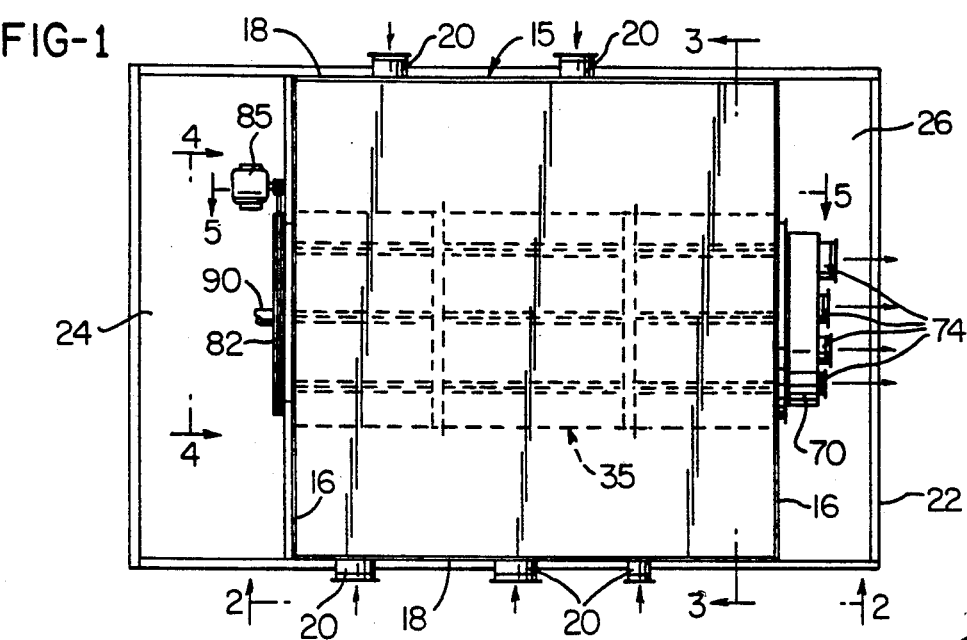
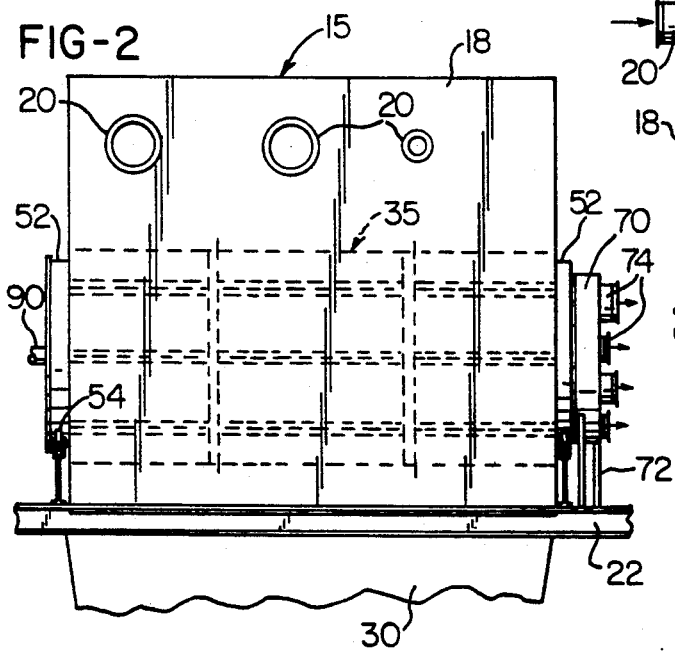
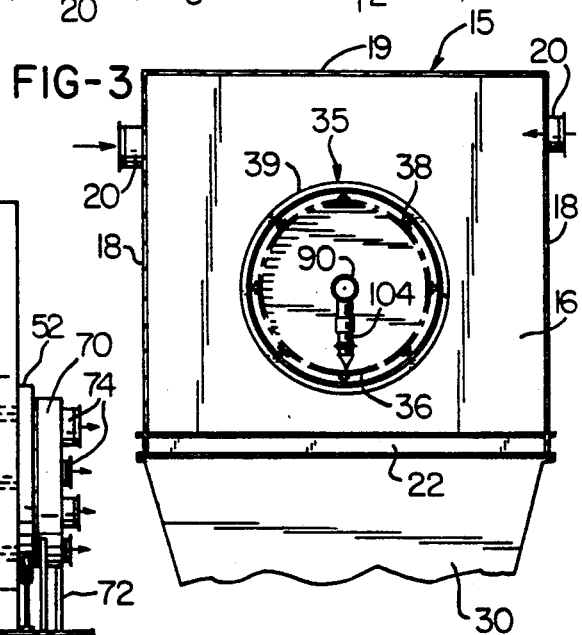
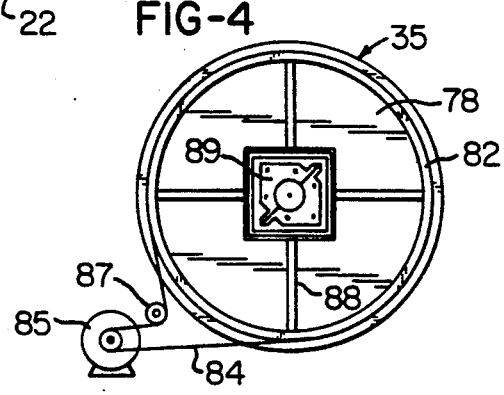

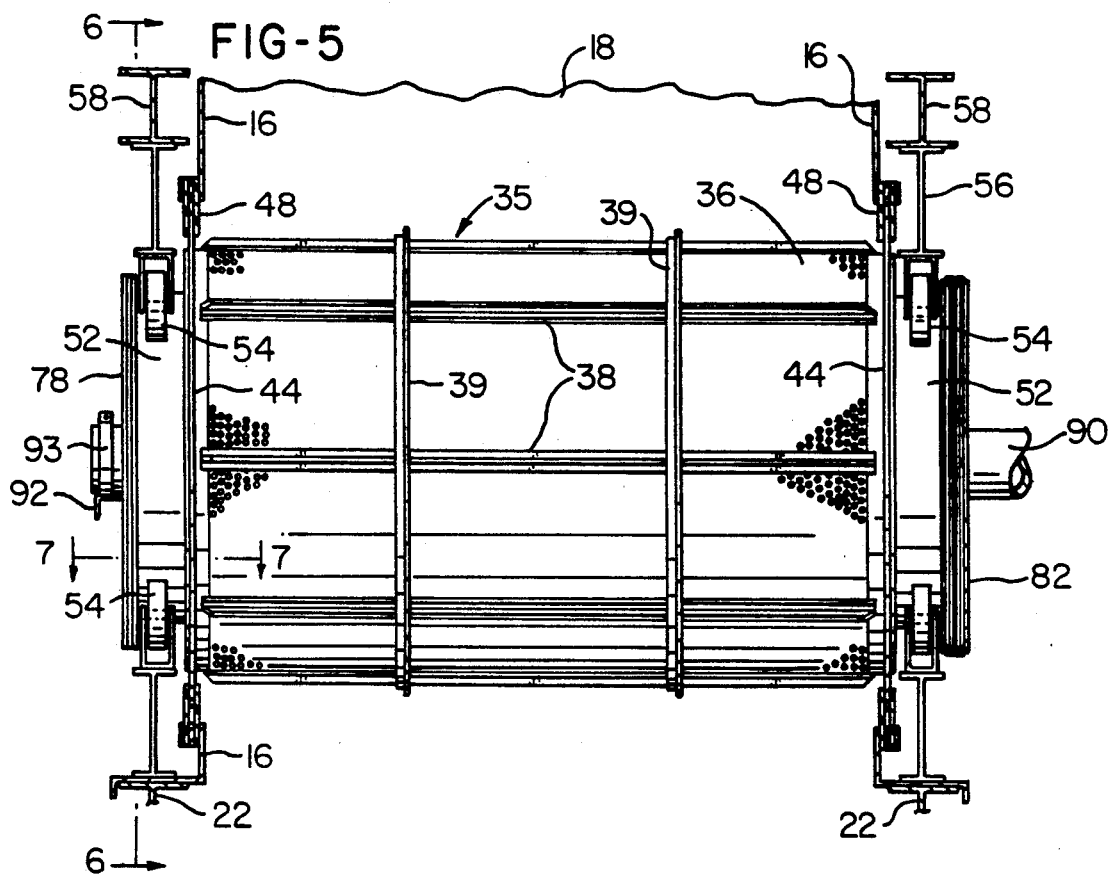
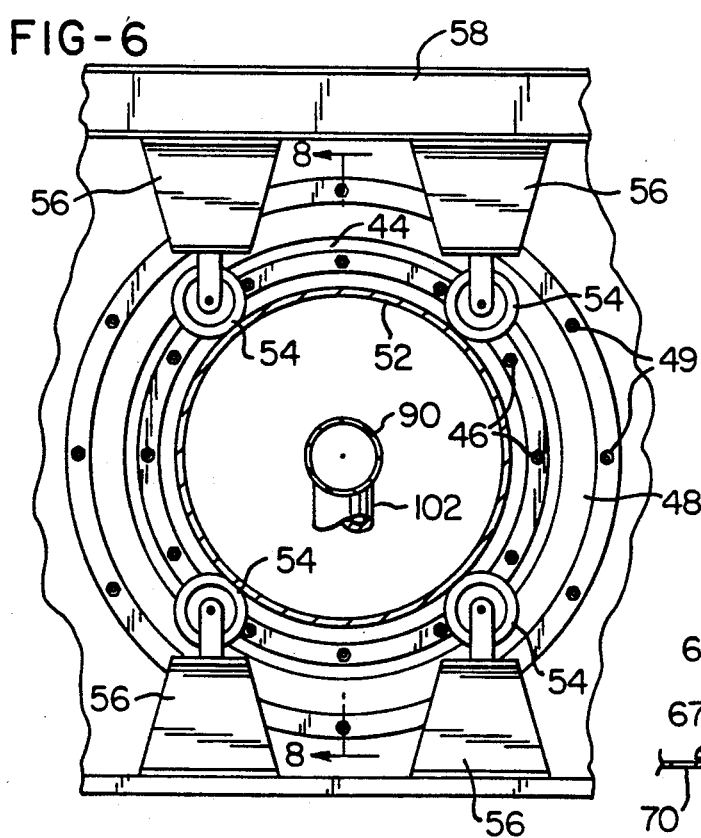
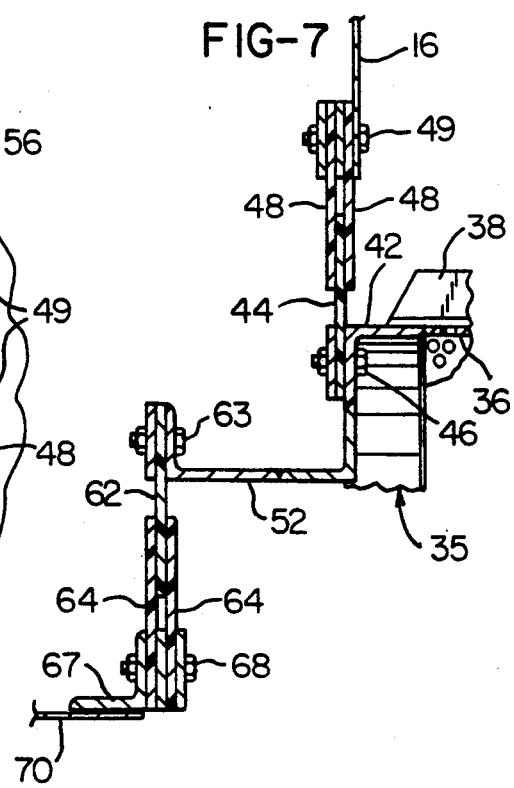

AIR CLEANING APPARATUS

BACKGROUND OF THE INVENTION

In the processing of sheets or webs of flexible materials such as sheets or webs of paper or paper board or fabrics, including the operations of slitting, cutting and punching of the sheets or webs, it is common to generate small scrap pieces of the material such as edge trimmings and hole punchings. The scrap pieces are removed from the processing machinery by air suction conduits connected to the inlets of motor driven blowers. It then becomes necessary to separate the small scrap pieces of material from the air, and it is desirable to reclaim the air so that the air is not exhausted into the atmosphere, since this can result in the loss of substantial heat from a building. Usually, the small scrap pieces of material are separated from the air with the use of cyclone separators. The cleaner air flowing from the separators is then directed into filter bags, for example, of the type produced by Menardi-Criswell in Augusta, Ga., which remove dust and other small particles from the air.

It has been found that a significant number of cyclone separators are required to clean a high volume flow of air carrying scrap pieces of material. In addition, some of the smaller scrap pieces flow through the separators and collect in the bag filters, thus requiring frequent replacement of the filter bags. When filter bags are not used, it is common to exhaust the air with the entrained dust and small particles into the atmosphere, resulting in contamination of the atmosphere and significant energy loss for the building.

SUMMARY OF THE INVENTION

The present invention is directed to an improved and efficient air cleaning or separating apparatus which is highly effective in removing or separating scrap pieces of material of all sizes from the air which collects and conveys the pieces. The apparatus of the invention is especially desirable when a high volume of scrap pieces is generated and with multiple conduits which direct the air carrying the scrap pieces of material. In general, the apparatus of the invention includes a rotary hollow drum having a cylindrical wall with perforations selected according to the size of the scrap pieces to be separated. The drum is supported for rotation on its center axis within a fabricated sheet metal housing. Rotary seals extend between opposite end portions of the drum and adjacent walls of the housing and also between the drum and a stationary outlet manifold at one end of the drum and outboard of the housing.

The housing has one or more inlets which connect with conduits directing air and scrap pieces of material into the housing. As the air flows inwardly into the rotating drum, the scrap pieces of material collect on the outer surface of the drum, and the scrap pieces are blown downwardly from the bottom of the drum into a bottom hopper by a stationary air jet tube located within the bottom portion of the drum adjacent the rotating perforated wall. A power driven blower supplies air to the air jet tube within the drum, and other blowers suck the clean air from the stationary air outlet manifold and direct the air through a set of filter bags which collect any dust or fine particles remaining in the air after it is passed through the rotating drum separator.

Other features and advantages of the invention will be apparent from the following description, the accompanying drawings and the appended claims.

BRIEF DESCRIPTION OF THE DRAWINGS

FIG. 1 is a plan view of air cleaning or separating apparatus constructed in accordance with the invention;

FIG. 2 is a side elevational view of the apparatus, taken generally on the line 2—2 of FIG. 1;

FIG. 3 is an end elevational view of the apparatus, taken generally on the line 3—3 of line 1;

FIG. 4 is a fragmentary end view of the apparatus taken generally on the line 4—4 of FIG. 1;

FIG. 5 is a vertical section of the apparatus, taken generally on the line 5—5 of FIG. 1;

FIG. 6 is a fragmentary section of the apparatus, taken generally on the line 6—6 of FIG. 5;

FIG. 7 is an enlarged fragmentary section showing the rotary seals, taken generally on the line 7—7 of FIG. 5;

DESCRIPTION OF THE PREFERRED EMBODIMENT

Figure 8:
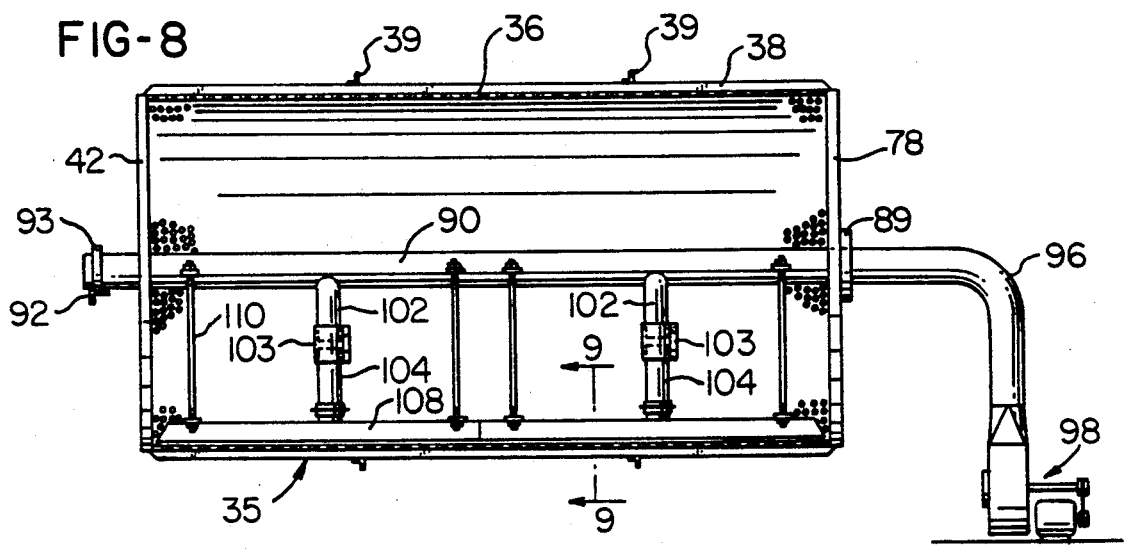
FIG. 8 is an axial section of the drum taken generally on the line 8—8 of FIG. 6.
Figure 9:
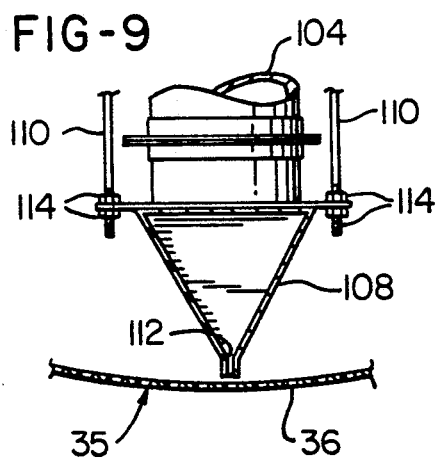
FIG. 9 is an enlarged fragmentary section taken generally on the line 9—9 of FIG. 8.

An air cleaning or separating apparatus constructed in accordance with the invention includes a large box-like fabricated sheet metal housing 15 has an open bottom and includes opposite vertical end wall 16 connected by opposite vertical side walls 18 and a flat horizontal top wall 19. Each of the side walls 18 has a set of inlet tubes 20 which connect to conduits extending from power driven blowers (not shown) for supplying air and entrained scrap pieces of material. The housing 15 is supported by a fabricated rectangular steel frame 22 having opposite end portions supporting checker or walkway plates 24 and 26 on which the operator of the apparatus may walk or stand. The frame 22 is designed for mounting on the framework of a building, for example, in the upper portion of the building under the roof. The frame 22 also supports a hopper 30 which is located directly under the open bottom housing 15.

A cylindrical hollow drum 35 is supported within the housing 15 for rotation on its axis and includes a perforated cylindrical wall 36 which is reinforced by axially extending and circumferentially spaced T-shaped ribs 38 and a set of axially spaced angle support rings 39. The opposite end portions of the perforated cylindrical wall 36 are connected to angular metal rings 42 (FIG. 7), and a flat sealing ring 44 is attached to each ring 42 by circumferentially spaced bolts 46. The sealing ring 44 projects outwardly between a pair axially spaced stationary sealing rings 48 which are attached to the corresponding end wall 16 of the housing 15 by circumferentially spaced bolts 49. Sufficient clearance is provided between the flat rings 44 and 48 so that each ring 44 may rotate freely between the rings 48 while forming an air seal therebetween.

A cylindrical roller channel 52 (FIG. 7) projects outwardly from each end ring 42 of the drum 35, and a set of four support rollers 54 engage each channel 52 to support the drum 35 for rotation on its axis. Each of the drum support rollers 54 is mounted on a corresponding I-beam section 56 which is supported by the base frame 22 and an overhead frame member 58 rigidly connected to the frame 22. A rotary flat sealing ring 62 (FIG. 7) is secured to the roller channel 52 at one end of the drum 35 by circumferentially spaced bolts 63, and the ring 62 projects inwardly between a pair of stationary sealing rings 64 connected to a stationary angular ring 67 by circumferentially spaced bolts 68. The ring 67 is part of a stationary pan-shaped air outlet manifold 70 (FIGS. 1 and 2). The manifold 70 is supported by a set of three legs 72 mounted on the frame 22 and has a set of air outlet tubes 74 which open into the drum 35.

The opposite end portion of the drum 35 carries a rotary sealing ring 44 and a roller channel 52 for receiving the rollers 54, but in place of the sealing ring 62, a circular end wall 78 (FIG. 4) closes the end of the drum 35. A double V-belt pulley 82 is also secured to the end wall 78 and adjacent roller channel 52 of the drum 35 and receives a pair of V-belts 84. The belts 84 extend around a drive pulley on an electric motor and gear reducer unit 85, and a spring loaded idler pulley 87 maintains the desired tension in the V-belts 84.

Referring to FIG. 4, the end wall 78 of the perforated drum 35 is reinforced by angle members 88 and supports a rotary bearing and sealing block 89 formed in two half sections. The block 89 supports one end portion of a non-rotating and axially extending air supply pipe or tube 90 (FIG. 8). The opposite end portion of the tube 90 is supported by a cross bar 92 and a clamp 93 (FIG. 5) within the stationary air outlet manifold 70. The tube 90 is connected by a duct 96 (FIG. 8) to a motor driven blower unit 98. A pair of axially spaced tube extensions 102 project downwardly from the stationary air supply tube 90 within the drum 35 and are connected by band-type couplings 103 to corresponding tubes 104 which project upwardly from the flat top wall of a triangular jet tube 108 extending axially within the lower portion of the drum 35. The jet tube 108 is supported by a set of adjustable threaded rods 110 which extend downwardly from brackets on the stationary center tube 90, and the jet tube 108 has a longitudinally or axially extending nozzle orifice 112 spaced slightly above the inner surface of the perforated cylindrical wall 36 of the drum 35. Before the couplings 103 are tightened, a set of nuts 114 on the threaded rods 110 are adjusted to position the axially extending air jet nozzle orifice 102 of the tube 108 as close as possible to the perforated drum wall 36 without the tube 108 touching the drum wall.

In operation of the separator apparatus described above in connection with FIGS. 1-9, the scrap pieces of material are collected by suction conduits connected to the inlets of motor driven blowers. (not shown) having outlets connected by conduits to corresponding inlet tubes 20 within the housing 15. The outlet tubes 74 on the end manifold 70 are also connected by conduits to the inlets of corresponding motor driven blowers (not shown) having outlets connected by conduits to corresponding filter bag collectors, as mentioned above. Thus there is a positive pressure drop between the inlet tubes 20 and the outlet tubes 74 so that the air which carries the scrap pieces of material into the housing 15 is forced to flow inwardly through the perforated cylindrical wall 36 of the rotating drum 35 since the clean air is sucked out of the drum through the outlet tubes 74. The scrap pieces of material collect on the outer surface of the perforated wall 36, and as the drum 35 rotates, the high velocity jet or stream of air from the nozzle slot 112 within the jet tube 108 progressively blows the scrap pieces from the outer surface of the wall 36 at the bottom of the drum 35 downwardly into the hopper 30.

As a result, the perforated wall 36 of the drum 35 is cleaned of scrap pieces of material during each revolution of the drum by the high velocity jet of air flowing outwardly through the axially extending orifice or slot 112.

From the drawings and the above description, it is apparent that an air cleaning system or apparatus constructed in accordance with the present invention, provides desirable features and advantages. In general, the apparatus is capable of handling a large flow rate of air and assures that all of the air blown into the housing 15 under pressure through the inlet tubes 20, passes through the rotary drum 35 for collection of all of the scrap pieces on the outer surface of the drum. More specifically, the rotary seals between the housing 15 and drum 35, as shown in FIG. 7, provide for free rotation of the drum and assure that all of the air carrying the scrap pieces passes into the rotary drum 35. In addition, the high velocity air jet flowing out of the jet tube 108 is effective to transfer all of the scrap pieces from the outer drum surface into the hopper 30 to assure a clean drum surface during each revolution of the drum.

While the form of air cleaning apparatus herein described constitutes a preferred embodiment of the invention, it is to be understood that the invention is not limited to this precise form of apparatus, and that changes may be made therein without departing from the scope and spirit of the invention as defined in the appended claims.

The invention having thus been described, the following is claimed:

1. Apparatus for separating small scrap pieces of paper or cardboard or other material from a flow of air used to collect and convey the pieces, said apparatus comprising an enclosed housing having opposite end walls connected by opposite side walls and a top wall to define a chamber having a bottom opening, means defining at least one air inlet within said housing for directing the flow of air carrying the pieces into said chamber, a hollow cylindrical drum disposed within said chamber and having opposite end portions connected to corresponding circular tracks and connected by a cylindrical perforated wall, a set of rollers engaging said tracks and supporting said drum for rotation within said chamber on a generally horizontal center axis of said drum, power operated means for rotating said drum, a stationary manifold disposed adjacent one of said end portions of said drum and defining at least one clean air outlet, means forming rotary air seals between said end walls of said housing and said end portions of said drum and between said drum and said manifold for directing the air flowing into said chamber inwardly through said perforated wall of said drum and from said drum through said manifold for collecting the scrap pieces on the outer surface of said perforated wall, a non-rotating air conduit extending axially within the center portion of said drum, a non-rotating air tube extending axially within a lower portion of said drum, means extending from said air conduit and supporting said air tube below said air conduit, air duct means connecting said air conduit to said air tube, said air tube having means defining an axially extending air jet slot adjacent the inner surface of said perforated wall, blower means connected to said air conduit for supplying a flow of air through said air duct means to said air tube and for producing a high velocity stream of air downwardly through said air jet slot to remove pieces from said perforated wall of said drum, and a hopper connected to said bottom opening of said housing for collecting the scrap pieces blown downwardly from said perforated wall of said drum.

2. Apparatus as defined in claim 1 wherein said circular tracks are outboard of said means forming said rotary air seals between said housing and said end portions of said drum.

3. Apparatus as defined in claim 1 wherein said power operated means for rotating said drum comprise an annular pulley having a diameter close to the diameter of said drum and connected to one of said end portions of said drum, an electric motor drive unit having an output shaft supporting a drive pulley, and at least one endless flexible belt connecting said annular pulley to said drive pulley.

* * * * *